(12) United States Patent
Goto et al.

(10) Patent No.: US 7,727,321 B2
(45) Date of Patent: *Jun. 1, 2010

(54) MAGENTA INK FOR INK-JET RECORDING

(75) Inventors: Kazuma Goto, Nagoya (JP); Shunichi Higashiyama, Yokkaichi (JP); Tomoyo Hamajima, Nagoya (JP); Narumi Koga, Nagoya (JP); Satoshi Okuda, Kiyosu (JP)

(73) Assignee: Brother Kogyo Kabushiki Kaisha (JP)

( * ) Notice: Subject to any disclaimer, the term of this patent is extended or adjusted under 35 U.S.C. 154(b) by 658 days.

This patent is subject to a terminal disclaimer.

(21) Appl. No.: 11/673,952

(22) Filed: Feb. 12, 2007

(65) Prior Publication Data

US 2007/0186807 A1    Aug. 16, 2007

(30) Foreign Application Priority Data

Feb. 16, 2006  (JP) ............... 2006-038748
Feb. 16, 2006  (JP) ............... 2006-038749
Feb. 16, 2006  (JP) ............... 2006-038751

(51) Int. Cl.
    *C09D 11/02*    (2006.01)
(52) U.S. Cl. ................................. 106/31.48
(58) Field of Classification Search ............... 106/31.48
    See application file for complete search history.

(56) References Cited

U.S. PATENT DOCUMENTS

| | | | |
|---|---|---|---|
| 3,336,285 A | 8/1967 | Towne et al. | |
| 3,853,895 A | 12/1974 | Lamm et al. | |
| 3,907,769 A | 9/1975 | Dehnert et al. | |
| 3,950,321 A | 4/1976 | Dehnert et al. | |
| 3,998,802 A | 12/1976 | Dehnert et al. | |
| 4,016,152 A | 4/1977 | Dehnert et al. | |
| 4,042,578 A | 8/1977 | Dehnert et al. | |
| 4,068,085 A | 1/1978 | Ramanathan et al. | |
| 4,128,545 A | 12/1978 | Dehnert et al. | |
| 5,144,015 A | 9/1992 | Chapman | |
| 5,599,386 A | 2/1997 | Sano et al. | |
| 5,609,673 A | 3/1997 | Takimoto | |
| 6,228,156 B1 | 5/2001 | Higashiyama et al. | |
| 7,108,743 B2 | 9/2006 | Fujiwara et al. | |
| 7,425,233 B2* | 9/2008 | Hamajima et al. | 106/31.49 |
| 7,465,345 B2* | 12/2008 | Okuda et al. | 106/31.28 |
| 2004/0122219 A1 | 6/2004 | Fujiwara et al. | |
| 2005/0057629 A1 | 3/2005 | Taguchi et al. | |
| 2007/0186806 A1* | 8/2007 | Goto et al. | 106/31.48 |
| 2007/0186807 A1* | 8/2007 | Goto et al. | 106/31.48 |
| 2007/0186812 A1* | 8/2007 | Koga et al. | 106/31.58 |
| 2007/0188573 A1* | 8/2007 | Hamajima et al. | 106/31.48 |
| 2007/0188574 A1* | 8/2007 | Kato et al. | 106/31.48 |
| 2009/0165673 A1* | 7/2009 | Taniguchi et al. | 106/31.48 |

FOREIGN PATENT DOCUMENTS

| | | |
|---|---|---|
| GB | 1 566 985 | 5/1980 |
| JP | 5246230 | 11/1977 |
| JP | 7278478 | 10/1995 |
| JP | 8073791 | 3/1996 |
| JP | 8311375 | 11/1996 |
| JP | 9202043 | 8/1997 |
| JP | 9235484 | 9/1997 |
| JP | 9241555 | 9/1997 |
| JP | 2000-095983 | 4/2000 |
| JP | 2000-265099 | 9/2000 |
| JP | 2002-371079 | 12/2002 |
| JP | 2002-371214 | 12/2002 |
| JP | 2003231823 | 8/2003 |

* cited by examiner

*Primary Examiner*—Helene Klemanski
(74) *Attorney, Agent, or Firm*—Banner & Witcoff, Ltd.

(57) ABSTRACT

A magenta ink for ink-jet recording contains a coloring agent, water and a water soluble organic solvent. Different types of dyes are employed as the coloring agent. In particular, a dye (1) represented by the general formula (1) is used together with at least one dye selected from the group consisting of a dye (2) represented by the general formula (2) in a free acid form, C. I. Acid Red 289 and C. I. Acid Red 52.

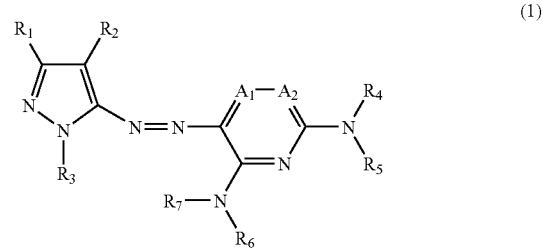

(1)

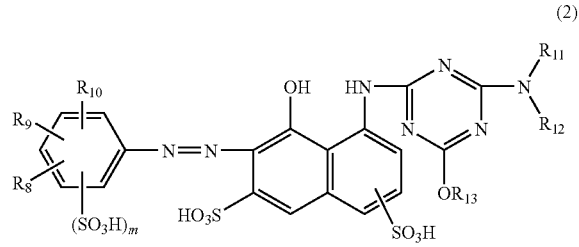

(2)

17 Claims, No Drawings

MAGENTA INK FOR INK-JET RECORDING

BACKGROUND OF THE INVENTION

1. Field of the Invention

The present invention relates to a magenta ink for ink-jet recording.

2. Description of the Related Art

In an ink-jet recording method, a magenta ink is required in order to form a full-color image. Generally known examples of the magenta dye used in such a magenta ink include C. I. Acid Red 14, C. I. Direct Red 227 and the like. Here, C. I. Acid Red 14 is a monoazo xanthene-based dye that is capable of imparting relatively good ejection stability and color developing properties to an ink, and C. I. Direct Red 227 is a disazo-based dye that is capable of imparting relatively good ejection stability to an ink (U.S. Pat. No. 6,228,156).

In recent years, an ink for ink-jet recording is required to not only exhibit good ejection stability and color developing properties but also to have additional characteristics such as a high level of light fastness and resistance to active gas such as ozone. Therefore, the dyes such as C. I. Acid Red 14 and C. I. Acid Red 227 are also required to exhibit these characteristics.

However, the magenta dyes such as C. I. Acid Red 14 and C. I. Direct Red 227 described above do not have sufficient light fastness and ozone resistance. Therefore, in an ink-jet recorded image produced using an ink-jet recording magenta ink containing either of such dyes, the degree of deterioration of the image is not insignificant even under normal storage conditions.

As described above, among magenta dyes commonly employed in a magenta ink for ink-jet recording, magenta dyes such as C. I. Acid Red 14 have relatively good color developing properties, i.e., they provide vivid color and have a hue suitable for obtaining a wide range of colors by color mixing. However, these dyes tend to have a relatively low level of light fastness and ozone resistance.

Meanwhile, a magenta dye such as a 1-alkyl-3-alkyl or aryl-4-cyano-pyrazole-5-yl azo dye disclosed in U.K. patent No. 1,566,985 is known to have relatively good light fastness and active gas resistance. However, a heavy metal cyanide is used in the manufacture of the dye, thereby causing problems with waste treatment. In addition to this, such a magenta dye has a hue insufficient to obtain a wide range of colors by color mixing and also has insufficient vividness. Furthermore, such a magenta dye is likely to cause problems when it comes into contact with various members employed in an ink-jet recording apparatus. Therefore, a problem exists with ejection stability during long-term use in an ink-jet printer provided with an ink-jet recording magenta ink in which such a magenta dye, having relatively good light fastness and active gas resistance is employed.

SUMMARY OF THE INVENTION

It is an object of the present invention to provide a magenta ink for ink-jet recording which has excellent storage stability for maintaining satisfactory ejection stability over long-term use and excellent color developing properties, and is capable of imparting good light fastness and ozone resistance to a recorded material recorded with the ink.

The present inventors have prepared a magenta ink for ink-jet recording using different types of magenta dyes. In particular, a specific pyrazolylazopyridine-based (or pyrazolylazopyrazine-based) dye has been used together with at least one dye selected from the group consisting of a specific triazinylamino-(phenylazo) naphthol-based dye, C. I. Acid Red 289 having a specific xanthene structure and C. I. Acid Red 52 having another specific xanthene structure. In this instance, the specific pyrazolylazopyridine-based (or pyrazolylazopyrazine-based) dye has poor color developing properties and ejection stability but has excellent light fastness and ozone resistance. Conversely, each of the specific triazinylamino-(phenylazo) naphthol-based dye, C. I. Acid Red 289 and C. I. Acid Red 52 has poor light fastness and ozone resistance but has excellent color developing properties and ejection stability. In this case, the inventors have found that the favorable characteristics of the two types of magenta dyes are not lost and that the level of these characteristics is not given by the arithmetic mean thereof. Rather, the inventors have unexpectedly found that these favorable characteristics are maintained. Therefore, the present invention has been completed.

Accordingly, the present invention provides a magenta ink for ink-jet recording, comprising a coloring agent, water and a water soluble organic solvent, wherein the coloring agent contains a dye (1) and at least one dye selected from the group consisting of a dye (2), C. I. Acid Red 289 and C. I. Acid Red 52, the dye (1) being represented by the general formula (1)

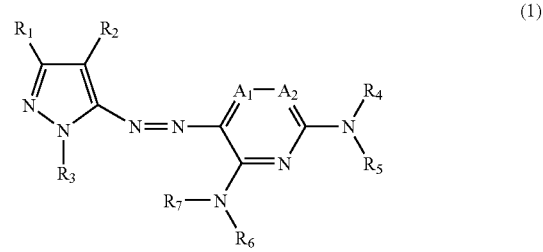

(1)

wherein $R_1$ represents a hydrogen atom, an optionally substituted alkyl group or an optionally substituted aryl group; $R_2$ represents a hydrogen atom, a halogen atom or a cyano group; $R_3$ represents a hydrogen atom, an optionally substituted alkyl group, an optionally substituted aryl group or an optionally substituted heterocyclic group; $R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group, provided that $R_4$ and $R_5$ are not simultaneously hydrogen atoms and that $R_6$ and $R_7$ are not simultaneously hydrogen atoms; and $A_1$ and $A_2$ are both optionally substituted carbon atoms, or one of $A_1$ and $A_2$ is an optionally substituted carbon atom and the other is a nitrogen atom, the magenta dye (2) being represented by the general formula (2) in a free acid form:

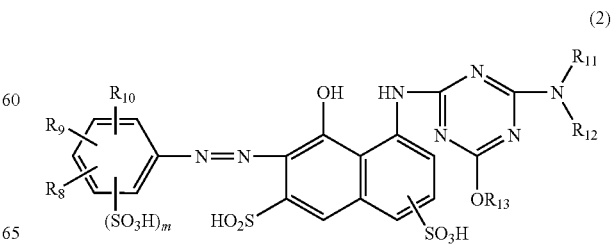

(2)

wherein $R_8$, $R_9$ and $R_{10}$ each independently represent an optionally substituted alkyl group, an optionally substituted alkoxy group, a halogen atom, a hydrogen atom, a hydroxyl group, an optionally substituted carbamoyl group, an optionally substituted sulfamoyl group, an optionally substituted amino group, a nitro group, a sulfonate group, an optionally substituted alkylsulfonyl group, an optionally substituted arylsulfonyl group, a carboxyl group or a carboxylate group; m represents a number of 0, 1 or 2; and $R_{11}$, $R_{12}$ and $R_{13}$ each independently represent a hydrogen atom, an optionally substituted alkyl group, an optionally substituted alkenyl group, an optionally substituted aryl group, an optionally substituted aralkyl group, an optionally substituted alicyclic group or an optionally substituted heterocyclic group.

In the magenta ink for ink-jet recording of the present invention, two types of magenta dyes are employed as the magenta dyes of the magenta ink for ink-jet recording. In particular, a specific pyrazolylazopyridine-based (or pyrazolylazopyrazine-based) dye is used together with at least one dye selected from the group consisting of a specific triazinylamino-(phenylazo) naphthol-based dye, C. I. Acid Red 289 having a specific xanthene structure and C. I. Acid Red 52 having another specific xanthene structure. Thus, excellent color developing properties and ejection stability can be imparted to the magenta ink, and excellent light fastness and ozone resistance can be imparted to an ink-jet recorded material recorded with the ink.

DETAILED DESCRIPTION OF THE PREFERRED EMBODIMENTS

The magenta ink for ink-jet recording of the present invention is characterized by containing water, a water soluble organic solvent and, as a coloring agent, the dye (1) represented by the above-described general formula (1) and at least one dye selected from the group consisting of the dye (2) represented by the general formula (2) in a free acid form, C. I. Acid Red 289 having a specific xanthene structure and C. I. Acid Red 52 having another specific xanthene structure. The characteristics of each of the dyes themselves and the advantages conferred by the combined use thereof will be described below.

The dye (1) represented by the general formula (1) has excellent light fastness and ozone resistance. However, conversely, the dye (1) has drawbacks, i.e., poor color developing properties and low vividness. Thus, when the dye (1) alone is employed as the magenta dye of the magenta ink for ink-jet recording, it is difficult to ensure a sufficient color reproduction range and to form a vivid color image. Furthermore, the dye (1) is likely to cause problems when it contacts with some members employed in an ink-jet recording apparatus. For example, the dye (1) is more likely to attack a metal part, a piezoelectric element, a water repellent film which constitutes an ink-jet head, an adhesive which bonds the above components together, and the like. Therefore, it is likely that problems of reduction in water repellency of the water repellent film, corrosion in an ink passage, adhesion of foreign substances to nozzles, and the like will arise. The adverse effects of the dye (1) on various materials of the ink-jet recording apparatus may cause not only a reduction in continuous ejection stability but also a reduction in long-term ejection stability. Furthermore, when the magenta ink contains a relatively large amount of the dye (1), it is feared that the frequency of occurrence of bubbles will increase in the ink-jet head and in the ink passage connected to the ink-jet head. Therefore, given these concerns, there is a fear of a reduction in ejection stability.

Conversely, the dye (2) represented by the general formula (2) in a free acid form, C. I. Acid Red 289 having a specific xanthene structure and C. I. Acid Red 52 having another specific xanthene structure exhibit poor light fastness and ozone resistance but have excellent vividness and color developing properties, in contrast to the dye (1). In addition to this, the dye (2), C. I. Acid Red 289 and C. I. Acid Red 52 have low attacking properties on various members employed in an ink-jet recording apparatus, and instead function to reduce the likelihood of the magenta ink attacking some of the members of the ink-jet recording apparatus (for example, on rubber members such as a rubber cap, wiper rubber and the like).

Generally, when two types of dyes having different characteristics are employed together, it is conceivable that the favorable characteristics of the dyes are lost, or that the level of these favorable characteristics is given by the arithmetic mean thereof even when these characteristics are not lost. However, when the dye (1) is employed together with at least one dye selected from the group consisting of the dye (2), C. I. Acid Red 289 and C. I. Acid Red 52, the advantage is unexpectedly obtained that the favorable characteristics of each of the dyes are maintained.

The magenta ink for ink-jet recording of the present invention contains the dye (1) and at least one dye selected from the group consisting of the dye (2), C. I. Acid Red 289 and C. I. Acid Red 52 in a ratio by weight usually in the range of about 7:3 to about 9:1 and often in the range of about 8:2 to about 9:1. When the ratio between the amount of the dyes falls within the above listed range, the favorable characteristics of each of the dyes can be fully utilized in a well-balanced manner.

The total amount of the dye (1) and at least one dye selected from the group consisting of the dye (2), C. I. Acid Red 289 and C. I. Acid Red 52 in the magenta ink for ink-jet recording is appropriately determined depending on the performance and required characteristics of the ink. The total amount of the dyes based on the total amount of the magenta ink for ink-jet recording is usually in the range of about 1 wt % to about 5 wt % and often in the range of about 2 wt % to about 4 wt %. Furthermore, in addition to the dye (1) and at least one or two dye(s) selected from the group consisting of the dye (2), C. I. Acid Red 289 and C. I. Acid Red 52, or in addition to the dye (1) and all of these three dyes, another dye may also be employed within the range which does not impair the positive effect of the present invention.

First, a description will be given of the substituents $R_1$ to $R_7$, $A_1$ and $A_2$ in the general formula (1) of the dye (1).

As described above, $R_1$ represents a hydrogen atom, an optionally substituted alkyl group or an optionally substituted aryl group. $R_2$ represents a hydrogen atom, a halogen atom or a cyano group. $R_3$ represents a hydrogen atom, an optionally substituted alkyl group, an optionally substituted aryl group or an optionally substituted heterocyclic group. $R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group. Here, $R_4$ and $R_5$ are not simultaneously hydrogen atoms, and $R_6$ and $R_7$ are not simultaneously hydrogen atoms. Furthermore, $A_1$ and $A_2$ are both optionally substituted carbon atoms, or one of $A_1$ and $A_2$ is an optionally substituted carbon atom and the other is a nitrogen atom.

Examples of the halogen atom in the general formula (1) include, but not limited to, a fluorine atom, a chlorine atom, a bromine atom and the like.

In the general formula (1), the alkyl group in the optionally substituted alkyl group is preferably an alkyl group having 1 to 6 carbon atoms, and examples of the substituent thereof include, but not limited to, a hydroxyl group, an alkoxy group (such as a methoxy group, an ethoxy group and the like), a cyano group, a halogen atom (such as a fluorine atom, a chlorine atom, a bromine atom and the like) and an ionic hydrophilic group (such as a carboxylate, a sulfonate and the like). Specific examples of the optionally substituted alkyl group include, but not limited to, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group and the like.

In the general formula (1), the aryl group in the optionally substituted aryl group is preferably an aryl group having 6 to 12 carbon atoms excluding the carbon atoms of the substituent thereof. Examples of the substituent include, but not limited to, an alkyl group (such as a methyl group, an ethyl group, an isopropyl group, a tert-butyl group, an n-octyl group and the like), an alkoxy group (see above), a halogen atom (see above), an alkylamino group (such as a methylamino group, a dimethylamino group and the like), an amide group, a carbamoyl group, a sulfamoyl group, a sulfonamide group, a hydroxyl group, an ester group (such as a methoxycarbonyl group, an ethoxycarbonyl group and the like) and an ionic hydrophilic group (see above). Specific examples of the optionally substituted aryl group include, but not limited to, a phenyl group, a naphthyl group, a p-tolyl group, a p-octylphenyl group, a mesityl group, a p-methoxyphenyl group, an o-chlorophenyl group, an m-(3-sulfopropylamino)phenyl group and the like.

In the general formula (1), the heterocyclic group in the optionally substituted heterocyclic group is preferably a heterocyclic group having a 5-ring or 6-ring. Examples of the substituent of the heterocyclic group include, but not limited to, an amide group, a carbamoyl group, a sulfamoyl group, a sulfonamide group, a hydroxyl group, an ester group (see above) and an ionic hydrophilic group (see above). Specific examples of the optionally substituted heterocyclic group include, but not limited to, a 2-pyridyl group, a 2-thienyl group, a 2-thiazolyl group, a 2-benzothiazolyl group, a 2-furyl group, a 6-sulfobenzothiazolyl group, a 6-sulfonate substituted benzothiazolyl group and the like.

In the general formula (1), examples of the substituent of the optionally substituted sulfonyl group include, but not limited to, an alkyl group (see above), an aryl group (see above) and the like. Specific examples of the optionally substituted sulfonyl group include, but not limited to, a methylsulfonyl group, a phenylsulfonyl group and the like.

In the general formula (1), examples of the acyl group in the optionally substituted acyl group include an acyl group having 1 to 12 carbon atoms excluding the carbon atoms of the substituent thereof. Examples of the substituent include, but not limited to, an ionic hydrophilic group (see above). Specific examples of the optionally substituted acyl group include, but not limited to, an acetyl group, a benzoyl group, a chloroacetyl group and the like.

As has been described, in the general formula (1), $A_1$ and $A_2$ are both optionally substituted carbon atoms, or one of $A_1$ and $A_2$ is an optionally substituted carbon atom and the other is a nitrogen atom. Preferably, $A_1$ and $A_2$ are both optionally substituted carbon atoms because better performance can be obtained. Examples of the substituent bonded to the carbon atoms $A_1$ and $A_2$ include, but not limited to, an alkyl group having 1 to 3 carbon atoms, a carboxyl group, a carbamoyl group, a cyano group and the like.

Furthermore, in the general formula (1), $R_4$ and $R_5$ are not simultaneously hydrogen atoms, and also $R_6$ and $R_7$ are not simultaneously hydrogen atoms. Moreover, when the number of substituents of sulfonic acid group or carboxyl group substituents is large, the water solubility of the magenta dye (1) tends to be improved. Therefore, it is preferable that the number of these substituents be adjusted in accordance with need.

As one embodiment of the dye (1), in the general formula (1), wherein $R_1$ is an alkyl group; $R_2$ is a cyano group; $R_3$ is a hydrogen atom or an optionally substituted heterocyclic group; $R_4$ is a hydrogen atom, an optionally substituted heterocyclic group or a substituted aryl group; $R_5$ and $R_6$ are each independently a substituted heterocyclic group or a substituted aryl group; $R_7$ is a hydrogen atom; $A_1$ is a substituted carbon atom; and $A_2$ is an optionally substituted carbon atom.

As a further embodiment of the dye (1), in the general formula (1), wherein $R_1$ is a tert-butyl group; $R_2$ is a cyano group; $R_3$ is a hydrogen atom or a benzothiazolyl group (preferably a benzothiazole-2-yl group) optionally substituted by a sulfonic acid group or an alkali metal sulfonate group; $R_4$ is a hydrogen atom, a benzothiazolyl group (preferably a benzothiazole-2-yl group) optionally substituted by a sulfonic acid group or an alkali metal sulfonate group or a trialkylphenyl group (preferably a mesityl group) substituted by a sulfonic acid group or an alkali metal sulfonate group; $R_5$ and $R_6$ are each independently a monoalkylphenyl, or trialkylphenyl group (preferably a p-octylphenyl or mesityl group) optionally substituted by a sulfonic acid group or an alkali metal sulfonate group or a benzothiazolyl group (preferably a benzothiazole-2-yl group) substituted by a sulfonic acid group or an alkali metal sulfonate group; $R_7$ is a hydrogen atom; $A_1$ is a carbon atom substituted by an alkyl group (preferably a methyl group); and $A_2$ is a carbon atom optionally substituted by a cyano group.

Specific examples of the dye (1) include, but not limited to, compounds represented by chemical formulas (1-A) to (1-E) below.

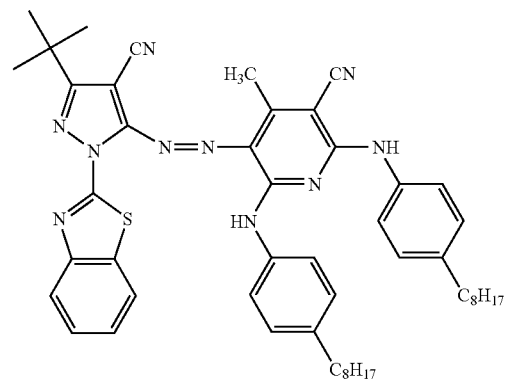

(1-A)

The compound represented by chemical formula (1-A) is an embodiment of the dye (1), wherein, in the general formula (1), $R_1$ is a tert-butyl group; $R_2$ is a cyano group; $R_3$ is a benzothiazole-2-yl group; $R_4$ is a hydrogen atom; $R_5$ and $R_6$ are each a p-octylphenyl group; $R_7$ is a hydrogen atom; $A_1$ is a carbon atom substituted by a methyl group; and $A_2$ is a carbon atom substituted by a cyano group.

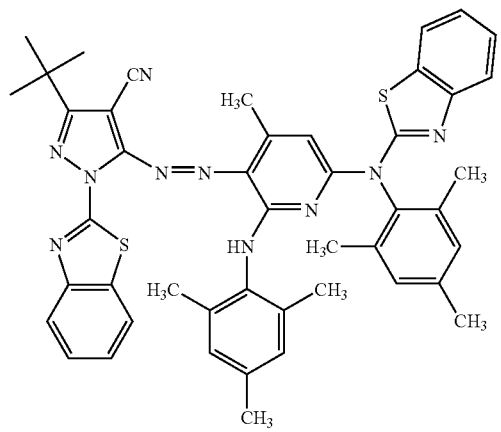

(1-B)

The compound represented by chemical formula (1-B) is another embodiment of the dye (1), wherein, in the general formula (1), $R_1$ is a tert-butyl group; $R_2$ is a cyano group; $R_3$ and $R_4$ are each a benzothiazole-2-yl group; $R_5$ and $R_6$ are each a mesityl group; $R_7$ is a hydrogen atom; $A_1$ is a carbon atom substituted by a methyl group; and $A_2$ is a carbon atom.

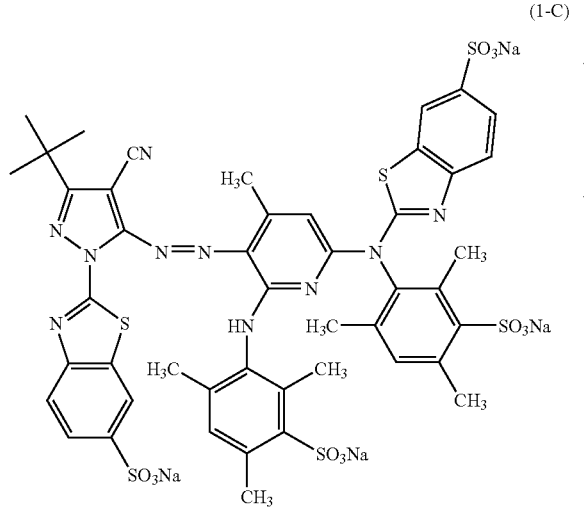

(1-C)

The compound represented by chemical formula (1-C) is yet another embodiment of the dye (1), wherein, in the general formula (1), $R_1$ is a tert-butyl group; $R_2$ is a cyano group; $R_3$ and $R_4$ are each a 6-sodium sulfonate-substituted benzothiazole-2-yl group; $R_5$ and $R_6$ are each a 3-sodium sulfonate-substituted mesityl group; $R_7$ is a hydrogen atom; $A_1$ is a carbon atom substituted by a methyl group; and $A_2$ is a carbon atom.

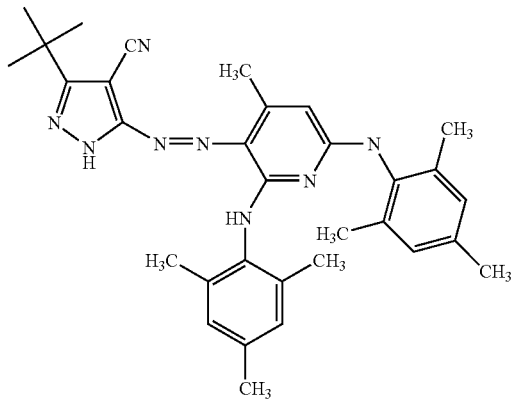

(1-D)

The compound represented by chemical formula (1-D) is another embodiment of the dye (1), wherein, in the general formula (1), $R_1$ is a tert-butyl group; $R_2$ is a cyano group; $R_3$ and $R_4$ are each a hydrogen atom; $R_5$ and $R_6$ are each a mesityl group; $R_7$ is a hydrogen atom; $A_1$ is a carbon atom substituted by a methyl group; and $A_2$ is a carbon atom.

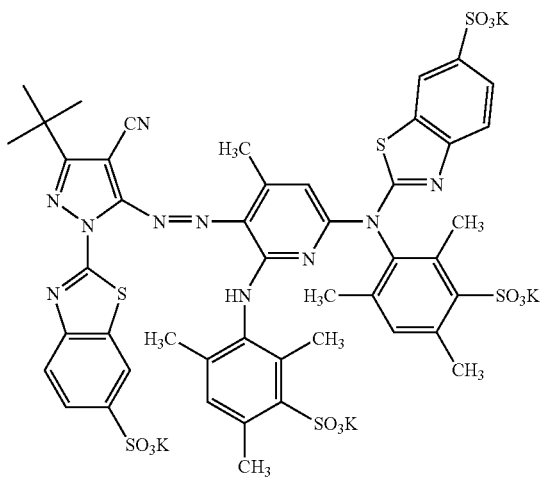

(1-E)

The compound represented by chemical formula (1-E) is yet another embodiment of the dye (1), wherein, in the general formula (1), $R_1$ is a tert-butyl group; $R_2$ is a cyano group; $R_3$ and $R_4$ are each 6-potassium sulfonate-substituted benzothiazole-2-yl group; $R_5$ and $R_6$ are each a 3-potassium sulfonate-substituted mesityl group; $R_7$ is a hydrogen atom; $A_1$ is a carbon atom substituted by a methyl group; and $A_2$ is a carbon atom.

The dye (1) represented by the general formula (1) can be produced by following steps (a) to (c) described below.

Step (a)

Aminopyrazole represented by the chemical formula (1a) is reacted with a diazotization agent to form a diazonium salt. As the diazotization agent, a dilute hydrochloric acid solution of sodium nitrite may be preferably employed. In addition, isopentyl nitrite, nitrosylsulfuric acid and the like may also be employed.

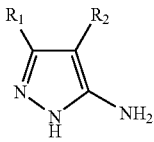

(1a)

Each of the substituents $R_1$ and $R_2$ in the chemical formula (1a) is the same as that described for the dye (1). The aminopyrazole represented by the chemical formula (1a) can be synthesized according to a method described in U.S. Pat. No. 3,336,285; "Heterocycles", 20, 519, (1983); Japanese Patent Publication No. Hei 6-19036 or the like.

Step (b)

Next, the diazonium salt formed in step (a) is reacted with a coupling agent represented by the chemical formula (1b) to form a compound represented by the chemical formula (1c).

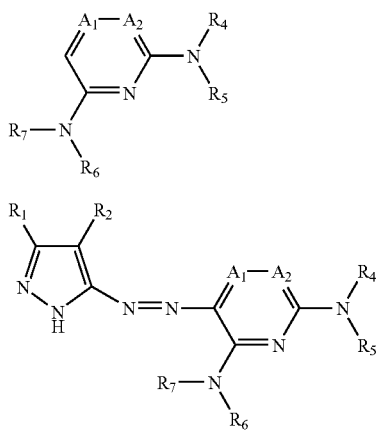

Each of the substituents $R_1$ to $R_7$ in the chemical formulas (1b) and (1c) is the same as that described for the dye (1). The pyridine-based coupling agent represented by chemical formula (1b) can be synthesized according to a method described in Japanese Patent Application Laid-Open No. Sho 51-83631, Japanese Patent Application Laid-Open No. Sho 49-74718, Japanese Patent Publication No. Sho 52-46230 or the like.

Step (c)

Subsequently, the compound formed in step (b) is reacted with an alkylating agent, an arylating agent or a heterylating agent in the presence of a base, thereby obtaining the dye (1) represented by the general formula (1). As the base employed in this step, an organic base such as diisopropylethylamine and the like or an inorganic base such as potassium carbonate, sodium carbonate, sodium hydrogen carbonate, potassium hydrogen carbonate, sodium hydroxide, potassium hydroxide and the like may be employed. The alkylating agent is a compound represented by "R—X." Here, R is an optionally substituted alkyl group. Furthermore, X is a halogen atom or $OSO_2R'$, wherein R' is an alkyl group or an aryl group such as a phenyl group and the like. Moreover, the arylating agent is a compound represented by "Ar—X." In this instance, Ar is a phenyl group substituted by an electron-accepting group (preferably substituted by a substituent having a total Hammett's σp value of 0.2 or more). The heterylating agent is a compound represented by "Het-X." In this instance, Het is a hetero ring. Examples of the hetero ring include, but not limited to, a 2-pyridyl group, a 2-thienyl group, a 2-thiazolyl group, a 2-benzothiazolyl group, a triazyl group, a 2-furyl group and the like.

A description will now be given of the substituents $R_8$ to $R_{13}$ in the general formula (2) of the dye (2). In this instance, examples of the substituent capable of bonding to each of the substituents $R_8$ to $R_{13}$ include, but not limited to, the substituents described for formula (1) of the dye (1).

As described above, in the general formula (2), $R_8$, $R_9$ and $R_{10}$ each independently represent an optionally substituted alkyl group, an optionally substituted alkoxy group, a halogen atom, a hydrogen atom, a hydroxyl group, an optionally substituted carbamoyl group, an optionally substituted sulfamoyl group, an optionally substituted amino group, a nitro group, a sulfonate group, an optionally substituted alkylsulfonyl group, an optionally substituted arylsulfonyl group, a carboxyl group or a carboxylate group. m represents a number 0, 1 or 2. $R_{11}$, $R_{12}$ and $R_{13}$ each independently represent a hydrogen atom, an optionally substituted alkyl group, an optionally substituted alkenyl group, an optionally substituted aryl group, an optionally substituted aralkyl group, an optionally substituted alicyclic group or an optionally substituted heterocyclic group.

A description is given of the substituents represented by $R_8$, $R_9$ and $R_{10}$ in the general formula (2). Examples of the optionally substituted alkyl group include, but not limited to, an alkyl group having 1 to 9 carbon atoms in total. Specific examples of such an alkyl group include, but not limited to, a methyl group, an ethyl group, an n-propyl group, an isopropyl group, an n-butyl group, a trifluoromethyl group, a dimethylaminomethyl group and the like. Examples of the optionally substituted alkoxy group include, but not limited to, an alkoxy group having 1 to 9 carbon atoms in total. Specific examples of such an alkoxy group include, but not limited to, a methoxy group, an isopropoxy group, an n-butoxy group and the like. Specific examples of the halogen atom include, but not limited to, a fluorine atom, a chlorine atom, a bromine atom and the like. Specific examples of the optionally substituted carbamoyl group include, but not limited to, a carbamoyl group, an N,N-dimethylcarbamoyl group, a phenylcarbamoyl group and the like. Specific examples of the optionally substituted sulfamoyl group include, but not limited to, a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group and the like. Specific examples of the optionally substituted amino group include, but not limited to, an N-methylamino group, a carbamoylamino group, an N,N-diethylamino group, an acetylamino group and the like. Examples of the sulfonate group include, but not limited to, a phenoxysulfonyl group and the like. Examples of the optionally substituted alkylsulfonyl group include, but not limited to, an alkylsulfonyl group having 1 to 9 carbon atoms in total. Specific examples of such an alkylsulfonyl group include, but not limited to, a hydroxyethylsulfonyl group and the like. Examples of the optionally substituted arylsulfonyl group include, but not limited to, an arylsulfonyl group having 6 to 15 carbon atoms in total. Specific examples of such an arylsulfonyl group include, but not limited to, a benzylsulfonyl group and the like. Specific examples of the carboxylate group include, but not limited to, a methoxycarboxyl group and the like.

A description will be given of the substituents represented by $R_{11}$, $R_{12}$ and $R_{13}$ in the general formula (2). Examples of the optionally substituted alkyl group include, but not limited to, an alkyl group having 1 to 18 carbon atoms in total. Specific examples of such an alkyl group include, but not limited to, an ethyl group, an n-butyl group, an n-octyl group, an ethylhexyl group, a hydroxyethyl group, a carboxypropyl group, a carboxycyclohexylmethyl group, a 1-carboxy-2- mercaptoethyl group, a 1-carboxy-2-carbamoyl-ethyl group, a 1-isopropyl-1-carboxymethyl group, a 1,2-dicarboxypropyl group and the like. Examples of the optionally substituted alkenyl group include, but not limited to, an alkenyl group having 2 to 18 carbon atoms in total. Specific examples of such an alkenyl group include, but not limited to, a 2-methyl-1-propenyl group, a vinyl group, an allyl group and the like. Specific examples of the optionally substituted aryl group include, but not limited to, a 3,4-dicarboxyphenyl group, a 4-butylphenyl group, a 4-carboxyphenyl group and the like. Specific examples of the optionally substituted aralkyl group include, but not limited to, a benzyl group, a 1-carboxy-2-phenyl-ethyl group, a 1-carboxy-2-hydroxyphenylethyl group, a 4-carboxybenzyl group and the like. Specific examples of the optionally substituted alicyclic group include, but not limited to, a cyclohexyl group, a 4-carboxycyclohexyl group and the like. Specific examples of the optionally substituted heterocyclic group include, but not limited to, a pyridyl group, a thiadiazolyl group, a benzothiazolyl group, a 2,2,6,6-tetramethylpiperidinyl group and the like. Furthermore, at least one of $R_{11}$, $R_{12}$ and $R_{13}$ may be an alkyl, alkenyl, aryl, alicyclic, aralkyl or heterocyclic group substituted by one to four carboxyl or sulfamoyl groups. Moreover, $R_{11}$ and $R_{12}$ may be each independently a hydrogen atom or a trisubstituted phenyl group. In this instance, the three substituents of the trisubstituted phenyl group are each independently a hydrogen atom, a halogen atom, a hydroxyl group, an optionally substituted alkyl group having 1 to 9 carbon atoms in total, an optionally substituted alkoxy group having 1 to 9 carbon atoms in total, an optionally substituted carbamoyl group, an optionally substituted sulfamoyl group, an optionally substituted amino group, a nitro group, a sulfonate group or a carboxylate group.

As one embodiment of the dye (2), in the general formula (2), wherein at least one of $R_{11}$, $R_{12}$ and $R_{13}$ is an alkyl, alkenyl, aryl, aralkyl or cyclohexyl group substituted by one to four carboxyl or sulfamoyl groups.

Preferably, in the dye (2) represented by the general formula (2), the total number of sulfonic acid, carboxyl, sulfonate and carboxylate groups contained in its structure is six or less, often five or less and more often four or less. Furthermore, the dye (2) may be used in the free acid form. However, when the dye (2) is obtained in a salt form during manufacturing, it may be used without conversion or may be converted into a desired salt form. Moreover, a part of the acid groups may be in a salt form, and both a salt-form dye and a free acid-form dye may be present. Examples of such a salt form include, but not limited to, salts of alkali metals such as Na, Li, K and the like, ammonium salts optionally substituted by an alkyl group or a hydroxyalkyl group, and salts of organic amines. Examples of the organic amines include, but not limited to, a lower alkylamine, a hydroxy-substituted lower alkylamine, a carboxy-substituted lower alkylamine, a polyamine having 2 to 10 alkyleneimine units each having 2 to 4 carbon atoms and the like. The number of the types of these salts used in not limited to 1, but a plurality of types of the salts may be present.

Another embodiment of the dye (2) is a dye represented by the general formula (2), wherein m is 0; $R_8$ is a carboxyl group, a carbamoyl group, a trifluoromethyl group or a sulfamoyl group; $R_9$ and $R_{10}$ are hydrogen atoms; $R_{11}$ is a carboxyalkyl group or a phenyl group optionally substituted by a carboxyl group or a sulfamoyl group; $R_{12}$ is a hydrogen atom; and $R_{13}$ is a hydrogen atom or an alkyl group.

Particularly, specific examples of the dye (2) include, but not limited to, compounds represented by the chemical formulas (2-A) to (2-E) below.

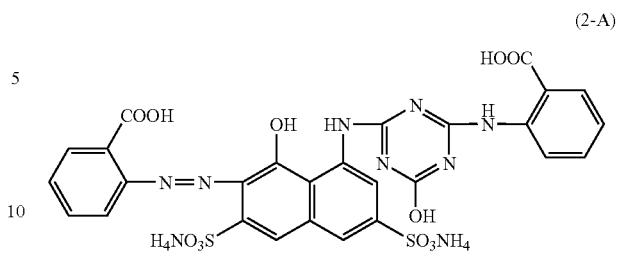

(2-A)

The compound represented by the chemical formula (2-A) is an embodiment of the dye (2), wherein, in the general formula (2), m is 0; $R_8$ is a carboxyl group at the 2-position of the phenyl group bonded to the azo group; $R_9$, $R_{10}$ and $R_{12}$ are hydrogen atoms; $R_{11}$ is a 2-carboxyphenyl group; and $R_{13}$ is a hydrogen atom.

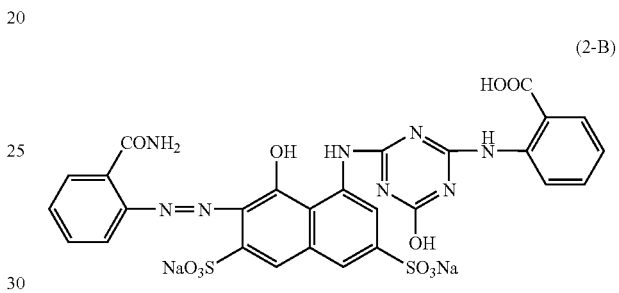

(2-B)

The compound represented by the chemical formula (2-B) is another embodiment of the dye (2), wherein, in the general formula (2), m is 0; $R_8$ is a carbamoyl group at the 2-position of the phenyl group bonded to the azo group; $R_9$, $R_{10}$ and $R_{12}$ are hydrogen atoms; $R_{11}$ is a 2-carboxyphenyl group; and $R_{13}$ is a hydrogen atom.

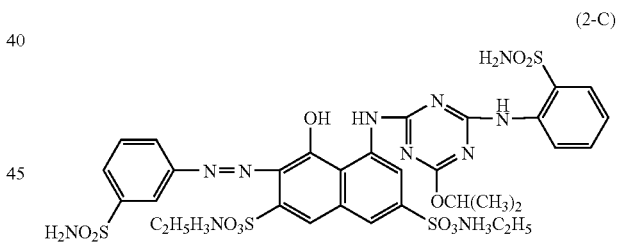

(2-C)

The compound represented by the chemical formula (2-C) is yet another embodiment of the dye (2), wherein, in the general formula (2), m is 0; $R_8$ is a sulfamoyl group at the 3-position of the phenyl group bonded to the azo group; $R_9$, $R_{10}$ and $R_{12}$ are hydrogen atoms; $R_{11}$ is a 2-sulfamoylphenyl group; and $R_{13}$ is an isopropyl group.

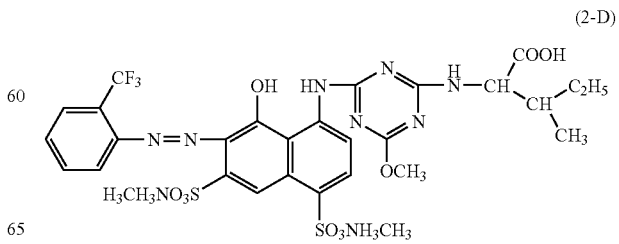

(2-D)

The compound represented by the chemical formula (2-D) is another embodiment of the dye (2), wherein, in the general formula (2), m is 0; $R_8$ is a trifluoromethyl group at the 2-position of the phenyl group bonded to the azo group; $R_9$, $R_{10}$ and $R_{12}$ are hydrogen atoms; $R_{11}$ is a 1-carboxy-2-methylbutyl group; and $R_{13}$ is a methyl group.

(2-E)

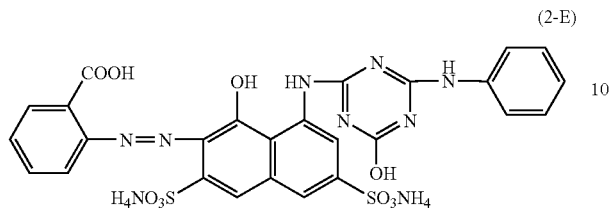

The compound represented by the chemical formula (2-E) is an embodiment of the dye (2), wherein, in the general formula (2), m is 0; $R_8$ is a carboxyl group at the 2-position of the phenyl group bonded to the azo group; $R_9$, $R_{10}$ and $R_{12}$ are hydrogen atoms; $R_{11}$ is a phenyl group; and $R_{13}$ is a hydrogen atom.

The dye (2) represented by the general formula (2) can be produced by a known method. For example, the dye (2) can be produced by the following steps (A) to (C) described below.

Step (A)

First, a monoazo compound is produced from 2-aminobenzoic acid (anthranilic acid) and 1-amino-8-hydroxy-3,6-naphthalenedisulfonic acid (H acid) by a routine method (see, for example, pp. 396 to 409 of "SHIN SENRYO KAGAKU (New Dye Chemistry)", written by Yutaka Hosoda, published by Gihodo, Dec. 21, 1973) through diazotization and coupling reaction.

Step (B)

The obtained monoazo compound is added to a cyanuric chloride suspension and allowed to react for several hours. At this time, the reaction mixture is maintained at a pH of 4 to 6 and a temperature of 0° C. to 5° C. Subsequent to this reaction, an aqueous solution of 2-aminobenzoic acid (anthranilic acid) is added to the reaction mixture at room temperature in order to prevent the reaction mixture from becoming alkaline, and the reaction mixture is subjected to condensation reaction for several hours. Subsequently, 25% aqueous solution of sodium hydroxide is added to the reaction mixture at 50° C. to 60° C. to make the reaction mixture strong alkaline, thereby effecting a hydrolysis reaction. Thus, the reaction is completed.

Step (C)

After the reaction, the reaction mixture is cooled and is subjected to salting out with sodium chloride, thereby obtaining the dye (2).

C. I. Acid Red 289 can be available as a commercial dye product. In this instance, C. I. Acid Red 289 is a dye represented by, for example, the following general formula (3).

(3)

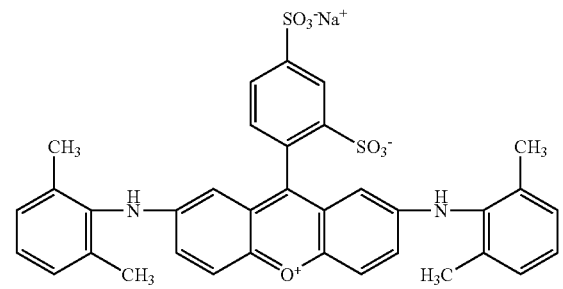

C. I. Acid Red 52 can be available as a commercial dye product. In this instance, C. I. Acid Red 52 is a dye represented by, for example, the following general formula (4).

(4)

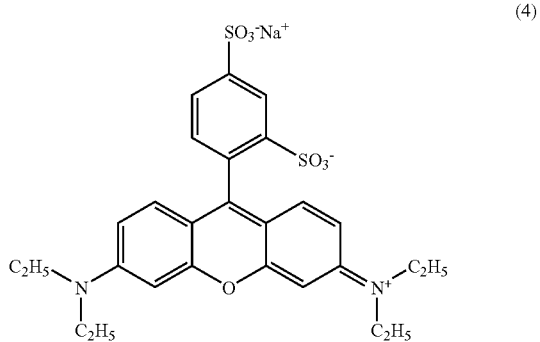

A description will now be given of water and a water soluble organic solvent contained in the magenta ink for ink-jet recording of the present invention.

The water employed in the present invention is preferably ion exchanged water containing a small amount of salts. The magenta ink for ink-jet recording contains various components in predetermined amounts, and the balance is made up with water. Therefore, the amount of water used depends on the amounts of the other components. The amount of water is normally in the range of about 10 wt % to about 90 wt % and is often in the range of about 40 wt % to about 80 wt %.

Examples of the water soluble organic solvent employed in the present invention include, but not limited to, a humectant for mainly preventing drying of ink at the end portion of the nozzles of an ink-jet head and a penetrant for mainly increasing drying speed on paper.

Examples of the humectant include, but not limited to, lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; polyalkylene glycols such as polyethylene glycol, polypropylene glycol and the like; alkylene glycols such as ethylene glycol, propylene glycol, butylene glycol, diethylene glycol, triethylene glycol, dipropylene glycol, tripropylene glycol, thiodiglycol, hexylene glycol and the like; glycerin; 2-pyrrolidone; N-methyl-2-pyrrolidone; 1,3-dimethyl-2-imidazolidinone; and the like. Of these, polyalcohols such as alkylene glycols, glycols and the like are suitable.

In the magenta ink for ink-jet recording, the amount of the humectant is generally in the range of 0 wt % to about 95 wt %, often in the range of about 10 wt % to about 80 wt % and more often in the range of about 10 wt % to about 50 wt %.

Furthermore, examples of the penetrant include, but not limited to, glycol-based ethers such as ethylene glycol methyl ether, ethylene glycol ethyl ether, ethylene glycol propyl ether, diethylene glycol methyl ether, diethylene glycol ethyl ether, diethylene glycol propyl ether, triethylene glycol methyl ether, triethylene glycol ethyl ether, triethylene glycol propyl ether, propylene glycol methyl ether, propylene glycol ethyl ether, propylene glycol propyl ether, dipropylene glycol methyl ether, dipropylene glycol ethyl ether, dipropylene glycol propyl ether, tripropylene glycol methyl ether, tripropylene glycol ethyl ether, tripropylene glycol propyl ether and the like.

In the magenta ink for ink-jet recording, the amount of the penetrant is generally in the range of 0 wt % to about 20 wt %, often in the range of about 0.1 wt % to about 15 wt % and more often in the range of about 1 wt % to about 10 wt %. It should be noted that, when the amount of the penetrant is too large, the penetrability of ink to paper may become excessively high to cause blurring.

The magenta ink for ink-jet recording of the present invention may contain other conventionally known additives including: viscosity modifiers such as polyvinyl alcohol, cellulose, water soluble resin and the like; surface tension modifiers; mildewproofing agents; and the like in accordance with need.

The magenta ink for ink-jet recording of the present invention can be prepared by uniformly mixing the coloring agent which contains dye (1) and at least one dye selected from the group consisting of dye (2), C. I. Acid Red 289 and C. I. Acid Red 52, water, the water soluble organic solvents and, if necessary, other various additives by means of routine methods.

EXAMPLES

Examples A1 to A7, Examples B1 to B7, Examples C1 to C7, Comparative Examples A1 to A6, Comparative Examples B1 to B6 and Comparative Examples C1 to C6

The components of each of the ink compositions shown in Tables 1 to 3 were mixed uniformly, thereby preparing each magenta ink for ink-jet recording. In this instance, dyes (1-A) to (1-E) correspond to the compounds represented by the chemical formulas (1-A) to (1-E), respectively. Dyes (2-A) to (2-E) correspond to the compounds represented by the chemical formulas (2-A) to (2-E), respectively.

For each of the obtained magenta inks for ink-jet recording, the following evaluations were performed: (a) evaluation of ejection stability, (b) evaluation of color developing properties, (c) evaluation of ozone resistance, (d) evaluation of light fastness and (e) overall evaluation.

First, each of the magenta inks for ink-jet recording was filled into a desired ink cartridge, and each ink cartridge was attached to a digital multifunction device equipped with an ink-jet printer (DCP-110C, product of Brother Industries, Ltd.) to perform the printing evaluation. As the samples for (b) evaluation of color developing properties, (c) evaluation of ozone resistance and (d) evaluation of light fastness, gradation samples for each of the magenta inks were printed on glossy paper (photo glossy paper (Model No. BP60GLA), product of Brother Industries, Ltd.). In this instance, a patch having an initial OD (optical density) value of 1.0 was employed.

(a) Evaluation of Ejection Stability 100 million dots (about 30 thousands sheets) were continuously printed, and evaluation was made according to the following criteria. The results obtained are shown in Tables 1 to 3.

Criteria for Ejection Stability Evaluation

AA: No non-ejection and ejection bending occur during continuous printing.

A: Non-ejection or ejection bending occurs to a small extent during continuous printing. The non-ejection or ejection bending is rectified by repeating purging at most five times.

C: Non-ejection and ejection bending occur to a large extent during continuous printing. Neither the non-ejection nor ejection bending is rectified in a short time.

(b) Evaluation of Color Developing Properties

Each of the above-listed gradation samples was visually observed to evaluate whether or not the color of magenta ink was satisfactorily developed according to the following criteria. The results obtained are shown in Tables 1 to 3.

Criteria for Evaluating Color Developing Properties

A: Magenta color is satisfactorily developed.

C: Magenta color is not satisfactorily developed.

(c) Evaluation of Ozone Resistance

An ozone resistance test was performed using the above gradation samples. The ozone resistance test was performed by allowing the samples to stand in an atmosphere with an ozone concentration of 1 ppm, a chamber temperature of 24° C., and a humidity of 60% RH for 40 hours using an Ozone Weather Meter OMS-H (product of Suga Test Instruments Co., Ltd.). Magenta-color patches having an OD value of 1.0 before the test was measured for an OD value after the ozone resistance test. The OD values were measured by means of a Spectrolino (product of Gretag Macbeth) (light source: $D_{65}$; viewing angle: 2°; Status A). An OD value reduction ratio for ozone resistance with respect to the OD value (1.0) of the patch before the test was determined from equation (I) below. The obtained OD value reduction ratio for ozone resistance was evaluated according to the following criteria. The results obtained are shown in Tables 1 to 3.

$$(OD \text{ value reduction ratio for ozone resistance}) = \{1.0 (OD \text{ value before test}) - (OD \text{ value after test})\} / \{1.0(OD \text{ value before test})\} * 100 \quad \text{(Equation I)}$$

Criteria for Evaluating Ozone Resistance

AA: The OD value reduction ratio for ozone resistance is less than 20%.

A: The OD value reduction ratio for ozone resistance is 20% or more and less than 30%.

B: The OD value reduction ratio for ozone resistance is 30% or more and less than 40%.

C: The OD value reduction ratio for ozone resistance is 40% or more.

(d) Evaluation of Light Fastness

A light fastness test was performed using the above gradation samples. The light fastness test was conducted using a high energy xenon weather meter SC750-WN (product of Suga Test Instruments Co., Ltd.). The gradation samples were irradiated with light radiated from a xenon light source for 100 hours at a room temperature of 25° C., a humidity of 50% RH, and an illuminance of 93,000 Lux. Magenta-color patches having an OD value of 1.0 before the test was measured for an OD value after the light fastness test. The OD values were measured by means of a Spectrolino (product of Gretag Macbeth) (light source: $D_{65}$; viewing angle: 2°; Status A). An OD value reduction ratio for light fastness with respect to the OD value (1.0) of the patch before the test was determined from equation (II) below. The obtained OD value reduction ratio for light fastness was evaluated according to the following criteria. The results obtained are shown in Tables 1 to 3.

$$(OD \text{ value reduction ratio for light fastness}) = \{1.0(OD \text{ value before test}) - (OD \text{ value after test})\} / \{1.0 (OD \text{ value before test})\} * 100 \quad \text{(Equation II)}$$

Criteria for Evaluating Light Fastness

AA: The OD value reduction ratio for light fastness is less than 20%.

A: The OD value reduction ratio for light fastness is 20% or more and less than 30%.

B: The OD value reduction ratio for light fastness is 30% or more and less than 40%.

C: The OD value reduction ratio for light fastness is 40% or more.

(e) Overall Evaluation

An overall evaluation was conducted based on the above evaluation results for each of the inks according to the following criteria. The results obtained are shown in Tables 1 to 3.

Criteria for Overall Evaluation

G: All of the evaluation results are AA or A.

NG: The evaluation results contain B or C.

TABLE 1

|  |  |  | Ex A1 | Ex A2 | Ex A3 | Ex A4 | Ex A5 | Ex A6 | Ex A7 |
|---|---|---|---|---|---|---|---|---|---|
| Ink composition (wt %) | Dye (1) | Dye (1-A) | — | 2.7 | — | — | — | — | — |
|  |  | Dye (1-B) | 2.85 | — | 2.4 | — | 1.8 | — | — |
|  |  | Dye (1-C) | — | — | — | 2.1 | — | — | — |
|  |  | Dye (1-D) | — | — | — | — | — | 1.6 | — |
|  |  | Dye (1-E) | — | — | — | — | — | — | 3.2 |
|  | Dye (2) | Dye (2-A) | — | 0.3 | — | — | 1.2 | — | — |
|  |  | Dye (2-B) | — | — | 0.6 | — | — | — | — |
|  |  | Dye (2-C) | — | — | — | 0.9 | — | — | — |
|  |  | Dye (2-D) | — | — | — | — | — | 0.4 | — |
|  |  | Dye (2-E) | 0.15 | — | — | — | — | — | 0.8 |
|  | Comparison Dye | C.I. Acid Red 14 | — | — | — | — | — | — | — |
|  |  | C.I. Direct Red 227 | — | — | — | — | — | — | — |
|  |  | Glycerin | 27.0 | 27.0 | 27.0 | 27.0 | 27.0 | 27.0 | 27.0 |
|  |  | Dipropylene glycol-n-propyl ether | 2.0 | 2.0 | 2.0 | 2.0 | 2.0 | 2.0 | 2.0 |
|  |  | OLFINE ® E1010 *1 | 0.2 | 0.2 | 0.2 | 0.2 | 0.2 | 0.2 | 0.2 |
|  |  | Proxel XL-2(S) *2 | 0.2 | 0.2 | 0.2 | 0.2 | 0.2 | 0.2 | 0.2 |
|  |  | Water | | | | Balance | | | |
| Ink |  | Weight ratio of dyes (Dye (1):Dye (2)) | 95:5 | 90:10 | 80:20 | 70:30 | 60:40 | 80:20 | 80:20 |
|  |  | Total amount of dyes in ink (wt %) | 3.0 | 3.0 | 3.0 | 3.0 | 3.0 | 2.0 | 4.0 |
| Evaluation |  | Ejection stability | A | AA | AA | AA | AA | AA | AA |
|  |  | Color developing properties | A | A | A | A | A | A | A |
|  |  | Ozone resistance | AA | AA | AA | AA | A | AA | AA |
|  |  | OD value reduction ratio of patch (initial OD = 1.0) (%) | 4 | 7 | 8 | 15 | 27 | 8 | 8 |
|  |  | Light fastness | AA | AA | AA | AA | A | AA | AA |
|  |  | OD value reduction ratio of patch (initial OD = 1.0) (%) | 5 | 5 | 7 | 9 | 25 | 7 | 7 |
|  |  | Overall evaluation | G | G | G | G | G | G | G |

|  |  |  | Comp Ex A1 | Comp Ex A2 | Comp Ex A3 | Comp Ex A4 | Comp Ex A5 | Comp Ex A6 |
|---|---|---|---|---|---|---|---|---|
| Ink composition (wt %) | Dye (1) | Dye (1-A) | 3.0 | — | — | — | — | — |
|  |  | Dye (1-B) | — | — | — | — | — | — |
|  |  | Dye (1-C) | — | 2.4 | — | — | — | — |
|  |  | Dye (1-D) | — | — | 2.4 | — | — | — |
|  |  | Dye (1-E) | — | — | — | — | — | — |
|  | Dye (2) | Dye (2-A) | — | — | — | 3.0 | — | — |
|  |  | Dye (2-B) | — | — | — | — | — | — |
|  |  | Dye (2-C) | — | — | — | — | — | — |
|  |  | Dye (2-D) | — | — | — | — | — | — |
|  |  | Dye (2-E) | — | — | — | — | — | — |
|  | Comparison Dye | C.I. Acid Red 14 | — | 0.6 | — | — | 3.0 | — |
|  |  | C.I. Direct Red 227 | — | — | 0.6 | — | — | 3.0 |
|  |  | Glycerin | 27.0 | 27.0 | 27.0 | 27.0 | 27.0 | 27.0 |
|  |  | Dipropylene glycol-n-propyl ether | 2.0 | 2.0 | 2.0 | 2.0 | 2.0 | 2.0 |
|  |  | OLFINE ® E1010 *1 | 0.2 | 0.2 | 0.2 | 0.2 | 0.2 | 0.2 |
|  |  | Proxel XL-2(S) *2 | 0.2 | 0.2 | 0.2 | 0.2 | 0.2 | 0.2 |
|  |  | Water | | | Balance | | | |
| Ink |  | Weight ratio of dyes (Dye (1):Dye (2)) | — | (80:20)*3 | (80:20)*3 | — | — | — |
|  |  | Total amount of dyes in ink (wt %) | 3.0 | 3.0 | 3.0 | 3.0 | 3.0 | 3.0 |
| Evaluation |  | Ejection stability | C | AA | AA | AA | AA | AA |
|  |  | Color developing properties | C | A | C | A | A | C |
|  |  | Ozone resistance | AA | B | B | C | C | C |
|  |  | OD value reduction ratio of patch (initial OD = 1.0) (%) | 2 | 32 | 35 | 58 | 62 | 60 |
|  |  | Light fastness | AA | B | A | C | C | C |
|  |  | OD value reduction ratio of patch (initial OD = 1.0) (%) | 4 | 34 | 21 | 40 | 49 | 51 |
|  |  | Overall evaluation | NG | NG | NG | NG | NG | NG |

*1: Acetylene glycol-based surfactant (product of Nissin Chemical Industry Co., Ltd.)
*2: Mildewproofing agent (product of Arch Chemicals, Inc.)
*3 For Comparative Example A2 and A3, weight ratio of dye (1) and comparison dye (C.I. Acid Red 14 or C.I. Direct Red 227)

TABLE 2

|  |  |  | Ex B1 | Ex B2 | Ex B3 | Ex B4 | Ex B5 | Ex B6 | Ex B7 |
|---|---|---|---|---|---|---|---|---|---|
| Ink composition (wt %) | Dye (1) | Dye (1-A) | — | 2.7 | — | — | — | — | — |
|  |  | Dye (1-B) | 2.85 | — | 2.4 | — | 1.8 | — | — |
|  |  | Dye (1-C) | — | — | — | 2.1 | — | — | — |
|  |  | Dye (1-D) | — | — | — | — | — | 1.6 | — |
|  |  | Dye (1-E) | — | — | — | — | — | — | 3.2 |
|  |  | C.I. Acid Red 289 | 0.15 | 0.3 | 0.6 | 0.9 | 1.2 | 0.4 | 0.8 |
|  | Comparison Dye | C.I. Acid Red 14 | — | — | — | — | — | — | — |
|  |  | C.I. Direct Red 227 | — | — | — | — | — | — | — |
|  |  | Glycerin | 27.0 | 27.0 | 27.0 | 27.0 | 27.0 | 27.0 | 27.0 |
|  |  | Dipropylene glycol-n-propyl ether | 2.0 | 2.0 | 2.0 | 2.0 | 2.0 | 2.0 | 2.0 |
|  |  | OLFINE ® E1010 *1 | 0.2 | 0.2 | 0.2 | 0.2 | 0.2 | 0.2 | 0.2 |
|  |  | Proxel XL-2(S) *2 | 0.2 | 0.2 | 0.2 | 0.2 | 0.2 | 0.2 | 0.2 |
|  |  | Water | Balance | | | | | | |
| Ink |  | Weight ratio of dyes (Dye (1):C.I. Acid Red 289)) | 95:5 | 90:10 | 80:20 | 70:30 | 60:40 | 80:20 | 80:20 |
|  |  | Total amount of dyes in ink (wt %) | 3.0 | 3.0 | 3.0 | 3.0 | 3.0 | 2.0 | 4.0 |
| Evaluation |  | Ejection stability | A | AA | AA | AA | AA | AA | AA |
|  |  | Color developing properties | A | A | A | A | A | A | A |
|  |  | Ozone resistance | AA | AA | AA | AA | A | AA | AA |
|  |  | OD value reduction ratio of patch (initial OD = 1.0) (%) | 5 | 6 | 6 | 16 | 25 | 9 | 12 |
|  |  | Light fastness | AA | AA | AA | AA | A | AA | AA |
|  |  | OD value reduction ratio of patch (initial OD = 1.0) (%) | 5 | 4 | 7 | 12 | 27 | 8 | 10 |
|  |  | Overall evaluation | G | G | G | G | G | G | G |

|  |  |  | Comp Ex B1 | Comp Ex B2 | Comp Ex B3 | Comp Ex B4 | Comp Ex B5 | Comp Ex B6 |
|---|---|---|---|---|---|---|---|---|
| Ink composition (wt %) | Dye (1) | Dye (1-A) | 3.0 | — | — | — | — | — |
|  |  | Dye (1-B) | — | — | — | — | — | — |
|  |  | Dye (1-C) | — | 2.4 | — | — | — | — |
|  |  | Dye (1-D) | — | — | 2.4 | — | — | — |
|  |  | Dye (1-E) | — | — | — | — | — | — |
|  |  | C.I. Acid Red 289 | — | — | — | 3.0 | — | — |
|  | Comparison Dye | C.I. Acid Red 14 | — | 0.6 | — | — | 3.0 | — |
|  |  | C.I. Direct Red 227 | — | — | 0.6 | — | — | 3.0 |
|  |  | Glycerin | 27.0 | 27.0 | 27.0 | 27.0 | 27.0 | 27.0 |
|  |  | Dipropylene glycol-n-propyl ether | 2.0 | 2.0 | 2.0 | 2.0 | 2.0 | 2.0 |
|  |  | OLFINE ® E1010 *1 | 0.2 | 0.2 | 0.2 | 0.2 | 0.2 | 0.2 |
|  |  | Proxel XL-2(S) *2 | 0.2 | 0.2 | 0.2 | 0.2 | 0.2 | 0.2 |
|  |  | Water | Balance | | | | | |
| Ink |  | Weight ratio of dyes (Dye (1):C.I. Acid Red 289)) | — | (80:20)*3 | (80:20)*3 | — | — | — |
|  |  | Total amount of dyes in ink (wt %) | 3.0 | 3.0 | 3.0 | 3.0 | 3.0 | 3.0 |
| Evaluation |  | Ejection stability | C | AA | AA | AA | AA | AA |
|  |  | Color developing properties | C | A | C | A | A | C |
|  |  | Ozone resistance | AA | B | B | C | C | C |
|  |  | OD value reduction ratio of patch (initial OD = 1.0) (%) | 2 | 32 | 35 | 56 | 62 | 60 |
|  |  | Light fastness | AA | B | A | C | C | C |
|  |  | OD value reduction ratio of patch (initial OD = 1.0) (%) | 4 | 34 | 18 | 58 | 49 | 51 |
|  |  | Overall evaluation | NG | NG | NG | NG | NG | NG |

*1: Acetylene glycol-based surfactant (product of Nissin Chemical Industry Co., Ltd.)
*2: Mildewproofing agent (product of Arch Chemicals, Inc.)
*3 For Comparative Example B2 and B3, weight ratio of dye (1) and comparison dye (C.I. Acid Red 14 or C.I. Direct Red 227)

TABLE 3

|  |  |  | Ex C1 | Ex C2 | Ex C3 | Ex C4 | Ex C5 | Ex C6 | Ex C7 |
|---|---|---|---|---|---|---|---|---|---|
| Ink composition (wt %) | Dye (1) | Dye (1-A) | — | 2.7 | — | — | — | — | — |
|  |  | Dye (1-B) | 2.85 | — | 2.4 | — | 1.8 | — | — |
|  |  | Dye (1-C) | — | — | — | 2.1 | — | — | — |
|  |  | Dye (1-D) | — | — | — | — | — | 1.6 | — |
|  |  | Dye (1-E) | — | — | — | — | — | — | 3.2 |
|  |  | C.I. Acid Red 52 | 0.15 | 0.3 | 0.6 | 0.9 | 1.2 | 0.4 | 0.8 |
|  | Comparison Dye | C.I. Acid Red 14 | — | — | — | — | — | — | — |
|  |  | C.I. Direct Red 227 | — | — | — | — | — | — | — |
|  |  | Glycerin | 27.0 | 27.0 | 27.0 | 27.0 | 27.0 | 27.0 | 27.0 |
|  |  | Dipropylene glycol-n-propyl ether | 2.0 | 2.0 | 2.0 | 2.0 | 2.0 | 2.0 | 2.0 |

TABLE 3-continued

|  |  |  |  |  |  |  |  |  |
|---|---|---|---|---|---|---|---|---|
|  | OLFINE ® E1010 *1 | 0.2 | 0.2 | 0.2 | 0.2 | 0.2 | 0.2 | 0.2 |
|  | Proxel XL-2(S) *2 | 0.2 | 0.2 | 0.2 | 0.2 | 0.2 | 0.2 | 0.2 |
|  | Water | Balance | | | | | | |
| Ink | Weight ratio of dyes (Dye (1):C.I. Acid Red 52) | 95:5 | 90:10 | 80:20 | 70:30 | 60:40 | 80:20 | 80:20 |
|  | Total amount of dyes in ink (wt %) | 3.0 | 3.0 | 3.0 | 3.0 | 3.0 | 2.0 | 4.0 |
| Evaluation | Ejection stability | A | AA | AA | AA | AA | AA | AA |
|  | Color developing properties | A | A | A | A | A | A | A |
|  | Ozone resistance | AA | AA | AA | AA | A | AA | AA |
|  | OD value reduction ratio of patch (initial OD = 1.0) (%) | 5 | 8 | 7 | 17 | 28 | 8 | 9 |
|  | Light fastness | AA | AA | AA | AA | A | AA | AA |
|  | OD value reduction ratio of patch (initial OD = 1.0) (%) | 6 | 5 | 6 | 11 | 24 | 8 | 8 |
|  | Overall evaluation | G | G | G | G | G | G | G |

|  |  |  | Comp Ex C1 | Comp Ex C2 | Comp Ex C3 | Comp Ex C4 | Comp Ex C5 | Comp Ex C6 |
|---|---|---|---|---|---|---|---|---|
| Ink composition (wt %) | Dye (1) | Dye (1-A) | 3.0 | — | — | — | — | — |
|  |  | Dye (1-B) | — | — | — | — | — | — |
|  |  | Dye (1-C) | — | 2.4 | — | — | — | — |
|  |  | Dye (1-D) | — | — | 2.4 | — | — | — |
|  |  | Dye (1-E) | — | — | — | — | — | — |
|  |  | C.I. Acid Red 52 | — | — | — | 3.0 | — | — |
|  | Comparison Dye | C.I. Acid Red 14 | — | 0.6 | — | — | 3.0 | — |
|  |  | C.I. Direct Red 227 | — | — | 0.6 | — | — | 3.0 |
|  |  | Glycerin | 27.0 | 27.0 | 27.0 | 27.0 | 27.0 | 27.0 |
|  | Dipropylene glycol-n-propyl ether | | 2.0 | 2.0 | 2.0 | 2.0 | 2.0 | 2.0 |
|  | OLFINE ® E1010 *1 | | 0.2 | 0.2 | 0.2 | 0.2 | 0.2 | 0.2 |
|  | Proxel XL-2(S) *2 | | 0.2 | 0.2 | 0.2 | 0.2 | 0.2 | 0.2 |
|  | Water | | Balance | | | | | |
| Ink | Weight ratio of dyes (Dye (1):C.I. Acid Red 52) | | — | (80:20)*3 | (80:20)*3 | — | — | — |
|  | Total amount of dyes in ink (wt %) | | 3.0 | 3.0 | 3.0 | 3.0 | 3.0 | 3.0 |
| Evaluation | Ejection stability | | C | AA | AA | AA | AA | AA |
|  | Color developing properties | | C | A | C | A | A | C |
|  | Ozone resistance | | AA | B | B | C | C | C |
|  | OD value reduction ratio of patch (initial OD = 1.0) (%) | | 2 | 32 | 35 | 62 | 62 | 60 |
|  | Light fastness | | AA | B | A | C | C | C |
|  | OD value reduction ratio of patch (initial OD = 1.0) (%) | | 4 | 34 | 18 | 51 | 49 | 51 |
|  | Overall evaluation | | NG | NG | NG | NG | NG | NG |

*1: Acetylene glycol-based surfactant (product of Nissin Chemical Industry Co., Ltd.)
*2: Mildewproofing agent (product of Arch Chemicals, Inc.)
*3 For Comparative Example C2 and C3, weight ratio of dye (1) and comparison dye (C.I. Acid Red 14 or C.I. Direct Red 227)

From the results shown in Tables 1 to 3, the following findings were obtained for Examples and Comparative Examples.

Example A1 (the total amount of dyes used in the coloring agent: 3%): This ink contains the dye (2-E), which can be used without causing problems to various component parts of the ink-jet recording apparatus and has good color developing properties, in an amount being 5% of the total amount of the dyes used in this example. Thus, the ink could be stably ejected, and the developed color was excellent. Furthermore, the ink contains the dye (1-B), which has good ozone resistance and good light fastness, in an amount being 95% of the total amount of the dyes used in this example. Thus, the ozone resistance and the light fastness were excellent.

Example A2 (the total amount of dyes used in the coloring agent: 3%): This ink contains the dye (2-A), which can be used without causing problems to various component parts of the ink-jet recording apparatus and has good color developing properties, in an amount being 10% of the total amount of the dyes used in this example. Thus, the ink could be stably ejected, and the developed color was excellent. Furthermore, the ink contains the dye (1-A), which has good ozone resistance and good light fastness, in an amount being 90% of the total amount of the dyes used in this example. Thus, the ozone resistance and the light fastness were excellent.

Example A3 (the total amount of dyes used in the coloring agent: 3%): This ink contains the dye (2-B), which can be used without causing problems to various component parts of the ink-jet recording apparatus and has good color developing properties, in an amount being 20% of the total amount of the dyes used in this example. Thus, the ink could be stably ejected, and the developed color was excellent. Furthermore, the ink contains the dye (1-B), which has good ozone resistance and good light fastness, in an amount being 80% of the total amount of the dyes used in this example. Thus, the ozone resistance and the light fastness were excellent.

Example A4 (the total amount of dyes used in the coloring agent: 3%): This ink contains the dye (2-C), which can be used without causing problems to various component parts of the ink-jet recording apparatus and has good color developing properties, in an amount being 30% of the total amount of the dyes used in this example. Thus, the ink could be stably ejected, and the developed color was excellent. Furthermore, the ink contains the dye (1-C), which has good ozone resistance and good light fastness, in an amount being 70% of the total amount of the dyes used in this example. Thus, the ozone resistance and the light fastness were excellent.

Example A5 (the total amount of dyes used in the coloring agent: 3%): This ink contains the dye (2-A), which can be used without causing problems to various component parts of the ink-jet recording apparatus and has good color developing properties, in an amount being 40% of the total amount of the dyes used in this example. Thus, the ink could be stably ejected, and the developed color was excellent. Furthermore, the ink contains the dye (1-B), which has good ozone resistance and good light fastness, in an amount being 60% of the total amount of the dyes used in this example. Thus, the ozone resistance and the light fastness were excellent. However, because the ratio of the amount of the dye (1-B) is somewhat smaller, the ozone resistance and the light fastness were somewhat poorer than those in Examples A1 to A4, A6 and A7.

Example A6 (the total amount of dyes used in the coloring agent: 2%): This ink contains the dye (2-D), which can be used without causing problems to various component parts of the ink-jet recording apparatus and has good color developing properties, in an amount being 20% of the total amount of the dyes used in this example. Thus, the ink could be stably ejected, and the developed color was excellent. Furthermore, the ink contains the dye (1-D), which has good ozone resistance and good light fastness, in an amount being 80% of the total amount of the dyes used in this example. Thus, the ozone resistance and the light fastness were excellent.

Example A7 (the total amount of dyes used in the coloring agent: 4%): This ink contains the dye (2-E), which can be used without causing problems to various component parts of the ink-jet recording apparatus and has good color developing properties, in an amount being 20% of the total amount of the dyes used in this example. Thus, the ink could be stably ejected, and the developed color was excellent. Furthermore, the ink contains the dye (1-E), which has good ozone resistance and good light fastness, in an amount being 80% of the total amount of the dyes used in this example. Thus, the ozone resistance and the light fastness were excellent.

Comparative Example A1 (the total amount of dyes in the coloring agent: 3%): In this ink, only the dye (1-A) is employed. Thus, although the ozone resistance and light fastness were excellent, a problem arose with ejection stability. Furthermore, the developed color was unsatisfactory.

Comparative Example A2 (the total amount of dyes in the coloring agent: 3%): This ink contains C. I. Acid Red 14, which can be used without causing problems to various component parts of the ink-jet recording apparatus and has good color developing properties, in an amount being 20% of the total amount of the dyes used in this. Thus, the ink could be stably ejected, and the developed color was excellent. However, C. I. Acid Red 14 has poor ozone resistance and poor light fastness. Therefore, even when C. I. Acid Red 14 was mixed with the dye (1-C), the ozone resistance and the light fastness were unsatisfactory.

Comparative Example A3 (the total amount of dyes in the coloring agent: 3%): This ink contains C. I. Direct Red 227, which can be used without causing problems to various component parts of the ink-jet recording apparatus, in an amount being 20% of the total amount of the dyes. Thus, the ink could be stably ejected. However, because C. I. Direct Red 227 having poor color developing properties was used in an amount being 20% of the total amount of the dyes, the developed color was unsatisfactory. Furthermore, C. I. Direct Red 227 has poor ozone resistance and poor light fastness. Therefore, even when C. I. Direct Red 227 was mixed with the dye (1-D), the ozone resistance and the light fastness were unsatisfactory.

Comparative Example A4 (the total amount of dyes in the coloring agents: 3%): In this ink, only the dye (2-A) is employed. Thus, the ink could be stably ejected, and the developed color was excellent. However, because the dye (2-A) has poor ozone resistance and poor light fastness, the ozone resistance and light fastness were unsatisfactory.

Comparative Example A5 (the total amount of dyes in the coloring agent: 3%): In this ink, only C. I. Acid Red 14 is employed. Thus, the ink could be stably ejected, and the developed color was excellent. However, because C. I. Acid Red 14 has poor ozone resistance and poor light fastness, the ozone resistance and light fastness were unsatisfactory.

Comparative Example A6 (the total amount of dyes in the coloring agent: 3%): In this ink, only C. I. Direct Red 227 is employed. Thus, the ink could be stably ejected. However, because C. I. Direct Red 227 has poor color developing properties, poor ozone resistance and poor light fastness. Therefore, the color developing properties, ozone resistance and light fastness were unsatisfactory.

Example B1 (the total amount of dyes used in the coloring agent: 3%): This ink contains C. I. Acid Red 289, which can be used without causing problems to various component parts of the ink-jet recording apparatus and has good color developing properties, in an amount being 5% of the total amount of the dyes used in this example. Thus, the ink could be stably ejected, and the developed color was excellent. Furthermore, the ink contains the dye (1-B), which has good ozone resistance and good light fastness, in an amount being 95% of the total amount of the dyes used in this example. Thus, the ozone resistance and the light fastness were excellent.

Example B2 (the total amount of dyes used in the coloring agent: 3%): This ink contains C. I. Acid Red 289, which can be used without causing problems to various component parts of the ink-jet recording apparatus and has good color developing properties, in an amount being 10% of the total amount of the dyes used in this example. Thus, the ink could be stably ejected, and the developed color was excellent. Furthermore, the ink contains the dye (1-A), which has good ozone resistance and good light fastness, in an amount being 90% of the total amount of the dyes used in this example. Thus, the ozone resistance and the light fastness were excellent.

Example B3 (the total amount of dyes used in the coloring agent: 3%): This ink contains C. I. Acid Red 289, which can be used without causing problems to various component parts of the ink-jet recording apparatus and has good color developing properties, in an amount being 20% of the total amount of the dyes used in this example. Thus, the ink could be stably ejected, and the developed color was excellent. Furthermore, the ink contains the dye (1-B), which has good ozone resistance and good light fastness, in an amount being 80% of the total amount of the dyes used in this example. Thus, the ozone resistance and the light fastness were excellent.

Example B4 (the total amount of dyes used in the coloring agent: 3%): This ink contains C. I. Acid Red 289, which can be used without causing problems to various component parts of the ink-jet recording apparatus and has good color developing properties, in an amount being 30% of the total amount of the dyes used in this example. Thus, the ink could be stably ejected, and the developed color was excellent. Furthermore, the ink contains the dye (1-C), which has good ozone resistance and good light fastness, in an amount being 70% of the total amount of the dyes used in this example. Thus, the ozone resistance and the light fastness were excellent.

Example B5 (the total amount of dyes used in the coloring agent: 3%): This ink contains C. I. Acid Red 289, which can be used without causing problems to various component parts of the ink-jet recording apparatus and has good color developing properties, in an amount being 40% of the total amount of the dyes used in this example. Thus, the ink could be stably ejected, and the developed color was excellent. Furthermore, the ink contains the dye (1-B), which has good ozone resistance and good light fastness, in an amount being 60% of the total amount of the dyes used in this example. Thus, the ozone resistance and the light fastness were excellent. However, because the ratio of the amount of the dye (1-B) is somewhat smaller, the ozone resistance and the light fastness were somewhat poorer than those in Examples B1 to B4, B6 and B7.

Example B6 (the total amount of dyes used in the coloring agent: 2%): This ink contains C. I. Acid Red 289, which can be used without causing problems to various component parts of the ink-jet recording apparatus and has good color developing properties, in an amount being 20% of the total amount of the dyes used in this example. Thus, the ink could be stably ejected, and the developed color was excellent. Furthermore, the ink contains the dye (1-D), which has good ozone resistance and good light fastness, in an amount being 80% of the total amount of the dyes used in this example. Thus, the ozone resistance and the light fastness were excellent.

Example B7 (the total amount of dyes used in the coloring agent: 4%): This ink contains C. I. Acid Red 289, which can be used without causing problems to various component parts of the ink-jet recording apparatus and has good color developing properties, in an amount being 20% of the total amount of the dyes used in this example. Thus, the ink could be stably ejected, and the developed color was excellent. Furthermore, the ink contains the dye (1-E), which has good ozone resistance and good light fastness, in an amount being 80% of the total amount of the dyes used in this example. Thus, the ozone resistance and the light fastness were excellent.

Comparative Example B1 (the total amount of dyes in the coloring agent: 3%): In this ink, only the dye (1-A) is employed. Thus, although the ozone resistance and light fastness were excellent, a problem arose with ejection stability. Furthermore, the developed color was unsatisfactory.

Comparative Example B2 (the total amount of dyes in the coloring agent: 3%): This ink contains C. I. Acid Red 14, which can be used without causing problems to various component parts of the ink-jet recording apparatus and has good color developing properties, in an amount being 20% of the total amount of the dyes used in this example. Thus, the ink could be stably ejected, and the developed color was excellent. However, C. I. Acid Red 14 has poor ozone resistance and poor light fastness. Therefore, even when C. I. Acid Red 14 was mixed with the dye (1-C), the ozone resistance and the light fastness were unsatisfactory.

Comparative Example B3 (the total amount of dyes in the coloring agent: 3%): This ink contains C. I. Direct Red 227, which can be used without causing problems to various component parts of the ink-jet recording apparatus, in an amount being 20% of the total amount of the dyes. Thus, the ink could be stably ejected. However, because C. I. Direct Red 227 having poor color developing properties was used in an amount being 20% of the total amount of the dyes, the developed color was unsatisfactory. Furthermore, C. I. Direct Red 227 has poor ozone resistance and poor light fastness. Therefore, even when C. I. Direct Red 227 was mixed with the dye (1-D), the ozone resistance and the light fastness were unsatisfactory.

Comparative Example B4 (the total amount of dyes in the coloring agents: 3%): In this ink, only C. I. Acid Red 289 is employed. Thus, the ink could be stably ejected, and the developed color was excellent. However, because C. I. Acid Red 289 has poor ozone resistance and poor light fastness, the ozone resistance and light fastness were unsatisfactory.

Comparative Example B5 (the total amount of dyes in the coloring agent: 3%): In this ink, only C. I. Acid Red 14 is employed. Thus, the ink could be stably ejected, and the developed color was excellent. However, because C. I. Acid Red 14 has poor ozone resistance and poor light fastness, the ozone resistance and light fastness were unsatisfactory.

Comparative Example B6 (the total amount of dyes in the coloring agent: 3%): In this ink, only C. I. Direct Red 227 is employed. Thus, the ink could be stably ejected. However, C. I. Direct Red 227 has poor color developing properties, poor ozone resistance and poor light fastness. Therefore, the color developing properties, ozone resistance and light fastness were unsatisfactory.

Example C1 (the total amount of dyes used in the coloring agent: 3%): This ink contains C. I. Acid Red 52, which can be used without causing problems to various component parts of the ink-jet recording apparatus and has good color developing properties, in an amount being 5% of the total amount of the dyes used in this example. Thus, the ink could be stably ejected, and the developed color was excellent. Furthermore, the ink contains the dye (1-B), which has good ozone resistance and good light fastness, in an amount being 95% of the total amount of the dyes used in this example. Thus, the ozone resistance and the light fastness were excellent.

Example C2 (the total amount of dyes used in the coloring agent: 3%): This ink contains C. I. Acid Red 52, which can be used without causing problems to various component parts of the ink-jet recording apparatus and has good color developing properties, in an amount being 10% of the total amount of the dyes used in this example. Thus, the ink could be stably ejected, and the developed color was excellent. Furthermore, the ink contains the dye (1-A), which has good ozone resistance and good light fastness, in an amount being 90% of the total amount of the dyes used in this example. Thus, the ozone resistance and the light fastness were excellent.

Example C3 (the total amount of dyes used in the coloring agent: 3%): This ink contains C. I. Acid Red 52, which can be used without causing problems to various component parts of the ink-jet recording apparatus and has good color developing properties, in an amount being 20% of the total amount of the dyes used in this. Thus, the ink could be stably ejected, and the developed color was excellent. Furthermore, the ink contains the dye (1-B), which has good ozone resistance and good light fastness, in an amount being 80% of the total amount of the dyes used in this example. Thus, the ozone resistance and the light fastness were excellent.

Example C4 (the total amount of dyes used in the coloring agent: 3%): This ink contains C. I. Acid Red 52, which can be used without causing problems to various component parts of the ink-jet recording apparatus and has good color developing properties, in an amount being 30% of the total amount of the dyes used in this example. Thus, the ink could be stably ejected, and the developed color was excellent. Furthermore, the ink contains the dye (1-C), which has good ozone resistance and good light fastness, in an amount being 70% of the total amount of the dyes used in this example. Thus, the ozone resistance and the light fastness were excellent.

Example C5 (the total amount of dyes used in the coloring agent: 3%): This ink contains C. I. Acid Red 52, which can be used without causing problems to various component parts of the ink-jet recording apparatus and has good color developing properties, in an amount being 40% of the total amount of the dyes used in this example. Thus, the ink could be stably ejected, and the developed color was excellent. Furthermore, the ink contains the dye (1-B), which has good ozone resistance and good light fastness, in an amount being 60% of the total amount of the dyes used in this example. Thus, the ozone resistance and the light fastness were excellent. However, because the ratio of the amount of the dye (1-B) is somewhat smaller, the ozone resistance and the light fastness were somewhat poorer than those in Examples C1 to C4, C6 and C7.

Example C6 (the total amount of dyes used in the coloring agent: 2%): This ink contains C. I. Acid Red 52, which can be used without causing problems to various component parts of the ink-jet recording apparatus and has good color developing properties in an amount being 20% of the total amount of the dyes used in this example. Thus, the ink could be stably ejected, and the developed color was excellent. Furthermore, the ink contains the dye (1-D), which has good ozone resistance and good light fastness, in an amount being 80% of the total amount of the dyes used in this example. Thus, the ozone resistance and the light fastness were excellent.

Example C7 (the total amount of dyes used in the coloring agent: 4%): This ink contains C. I. Acid Red 52, which can be used without causing problems to various component parts of the ink-jet recording apparatus and has good color developing properties, in an amount being 20% of the total amount of the dyes used in this example. Thus, the ink could be stably ejected, and the developed color was excellent. Furthermore, the ink contains the dye (1-E), which has good ozone resistance and good light fastness, in an amount being 80% of the total amount of the dyes used in this example. Thus, the ozone resistance and the light fastness were excellent.

Comparative Example C1 (the total amount of dyes in the coloring agent: 3%): In this ink, only the dye (1-A) is employed. Thus, although the ozone resistance and light fastness were excellent, a problem arose with ejection stability. Furthermore, the developed color was unsatisfactory.

Comparative Example C2 (the total amount of dyes in the coloring agent: 3%): This ink contains C. I. Acid Red 14, which can be used without causing problems to various component parts of the ink-jet recording apparatus and has good color developing properties, in an amount being 20% of the total amount of the dyes used in this example. Thus, the ink could be stably ejected, and the developed color was excellent. However, C. I. Acid Red 14 has poor ozone resistance and light fastness. Therefore, even when C. I. Acid Red 14 was mixed with the dye (1-C), the ozone resistance and the light fastness were unsatisfactory.

Comparative Example C3 (the total amount of dyes in the coloring agent: 3%): This ink contains C. I. Direct Red 227, which can be used without causing problems to various component parts of the ink-jet recording apparatus, in an amount being 20% of the total amount of the dyes used in this example. Thus, the ink could be stably ejected. However, because C. I. Direct Red 227 having poor color developing properties was used in an amount being 20% of the total amount of the dyes, the developed color was unsatisfactory. Furthermore, C. I. Direct Red 227 has poor ozone resistance and poor light fastness. Therefore, even when C. I. Direct Red 227 was mixed with the dye (1-D), the ozone resistance and the light fastness were unsatisfactory.

Comparative Example C4 (the total amount of dyes in the coloring agents: 3%): In this ink, only C. I. Acid Red 52 is employed. Thus, the ink could be stably ejected, and the developed color was excellent. However, because C. I. Acid Red 52 has poor ozone resistance and poor light fastness, the ozone resistance and light fastness were unsatisfactory.

Comparative Example C5 (the total amount of dyes in the coloring agent: 3%): In this ink, only C. I. Acid Red 14 is employed. Thus, the ink could be stably ejected, and the developed color was excellent. However, because C. I. Acid Red 14 has poor ozone resistance and poor light fastness, the ozone resistance and light fastness were unsatisfactory.

Comparative Example C6 (the total amount of dyes in the coloring agent: 3%): In this ink, only C. I. Direct Red 227 is employed. Thus, the ink could be stably ejected. However, C. I. Direct Red 227 has poor color developing properties, poor ozone resistance and poor light fastness. Therefore, the color developing properties, ozone resistance and light fastness were unsatisfactory.

The entire disclosures of the specifications, claims and summaries of Japanese Patent Applications Nos. 2006-038748, 2006-038749 and 2006-038751 filed on Feb. 16, 2006 are hereby incorporated by reference.

What is claimed is:

1. A magenta ink for ink-jet recording, comprising a coloring agent, water and a water soluble organic solvent, wherein the coloring agent contains a dye (1) and at least one dye selected from the group consisting of a dye (2), C. I. Acid Red 289 and C. I. Acid Red 52, the dye (1) being represented by the general formula (1)

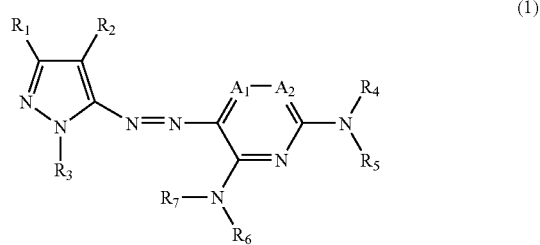

wherein $R_1$ represents a hydrogen atom, an optionally substituted alkyl group or an optionally substituted aryl group; $R_2$ represents a hydrogen atom, a halogen atom or a cyano group; $R_3$ represents a hydrogen atom, an optionally substituted alkyl group, an optionally substituted aryl group or an optionally substituted heterocyclic group; $R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group, provided that $R_4$ and $R_5$ are not simultaneously hydrogen atoms and that $R_6$ and $R_7$ are not simultaneously hydrogen atoms; and $A_1$ and $A_2$ are both optionally substituted carbon atoms, or one of $A_2$ and $A_2$ is an optionally substituted carbon atom and the other is a nitrogen atom, the dye (2) being represented by the general formula (2) in a free acid form:

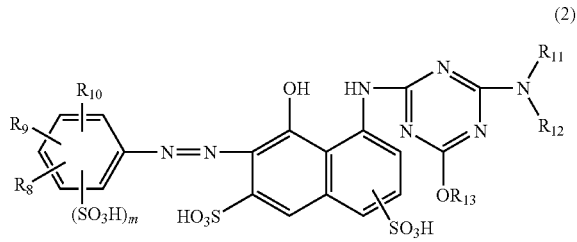

wherein $R_8$, $R_9$ and $R_{10}$ each independently represent an optionally substituted alkyl group, an optionally substituted alkoxy group, a halogen atom, a hydrogen atom, a hydroxyl group, an optionally substituted carbamoyl group, an optionally substituted sulfamoyl group, an optionally substituted amino group, a nitro group, a sulfonate group, an optionally substituted alkylsulfonyl group, an optionally substituted arylsulfonyl group, a carboxyl group or a carboxylate group; m represents a number of 0, 1 or 2; and $R_{11}$, $R_{12}$ and $R_{13}$ each independently represent a hydrogen atom, an optionally substituted alkyl group, an optionally substituted alkenyl group, an optionally substituted aryl group, an optionally substituted aralkyl group, an optionally substituted alicyclic group or an optionally substituted heterocyclic group.

2. The magenta ink for ink jet recording according to claim 1, containing the dye (1) and the dye selected from the group consisting of the dye (2), C. I. Acid Red 289 and C. I. Acid Red 52 in a ratio by weight of about 7:3 to about 9:1.

3. The magenta ink for ink jet recording according to claim 1, wherein a total amount of the dye (1) and the dye selected from the group consisting of the dye (2), C. I. Acid Red 289 and C. I. Acid Red 52 is about 1 wt % to about 5 wt % based on the total weight of the magenta ink.

4. The magenta ink for ink jet recording according to claim 1, wherein, in the general formula (1), $R_1$ is an alkyl group; $R_2$ is a cyano group; $R_3$ is a hydrogen atom or an optionally substituted heterocyclic group; $R_4$ is a hydrogen atom, an optionally substituted heterocyclic group or a substituted aryl group; $R_5$ and $R_6$ are each independently a substituted heterocyclic group or a substituted aryl group; $R_7$ is a hydrogen atom; $A_1$ is a substituted carbon atom; and $A_2$ is an optionally substituted carbon atom.

5. The magenta ink for ink-jet recording according to claim 4, wherein, in the general formula (1), $R_1$ is a tert-butyl group; $R_3$ is a hydrogen atom or a benzothiazolyl group optionally substituted by a sulfonic acid group or an alkali metal sulfonate group; $R_4$ is a hydrogen atom, a benzothiazolyl group optionally substituted by a sulfonic acid group or an alkali metal sulfonate group, or a trialkylphenyl group substituted by a sulfonic acid group or an alkali metal sulfonate group; $R_5$ and $R_6$ are each independently a monoalkylphenyl or trialkylphenyl group optionally substituted by a sulfonic acid group or an alkali metal sulfonate group, or a benzothiazolyl group substituted by a sulfonic acid group or an alkali metal sulfonate group; $A_1$ is a carbon atom substituted by an alkyl group; and $A_2$ is a carbon atom optionally substituted by a cyano group.

6. The magenta ink for ink-jet recording according to claim 5, wherein, in general formula (1), $R_3$ is a hydrogen atom or a benzothiazole-2-yl group optionally substituted by a sulfonic acid group or an alkali metal sulfonate group; $R_4$ is a hydrogen atom, a benzothiazole-2-yl group optionally substituted by a sulfonic acid group or an alkali metal sulfonate group, or a trimethylphenyl group substituted by a sulfonic acid group or an alkali metal sulfonate group; $R_5$ and $R_6$ are each independently a p-octylphenyl group optionally substituted by a sulfonic acid group or an alkali metal sulfonate group, or mesityl group optionally substituted by a sulfonic acid group or an alkali metal sulfonate group, or a benzothiazole-2-yl group substituted by a sulfonic acid group or an alkali metal sulfonate group; and $A_1$ is a carbon atom substituted by a methyl group; and $A_2$ is a carbon atom optionally substituted by a cyano group.

7. The magenta ink for ink-jet recording according to claim 6, wherein, in the general formula (1), $R_3$ is a benzothiazole-2-yl group; $R_4$ is a hydrogen atom; $R_5$ and $R_6$ are each a p-octylphenyl group; and $A_2$ is a carbon atom substituted by a cyano group.

8. The magenta ink for ink-jet recording according to claim 6, wherein, in the general formula (1), $R_3$ and $R_4$ are each a benzothiazole-2-yl group; $R_5$ and $R_6$ are each a mesityl group; and $A_2$ is a carbon atom.

9. The magenta ink for ink-jet recording according to claim 6, wherein, in the general formula (1), $R_3$ and $R_4$ are each a 6-sodium sulfonate-substituted benzothiazole-2-yl group; $R_5$ and $R_6$ are each a 3-sodium sulfonate-substituted mesityl group; and $A_2$ is a carbon atom.

10. The magenta ink for ink-jet recording according to claim 6, wherein, in the general formula (1), $R_3$ and $R_4$ are each a hydrogen atom; $R_5$ and $R_6$ are each a mesityl group; and $A_2$ is a carbon atom.

11. The magenta ink for ink-jet recording according to claim 6, wherein, in the general formula (1), $R_3$ and $R_4$ are each a 6-potassium sulfonate-substituted benzothiazole-2-yl group; $R_5$ and $R_6$ are each a 3-potassium sulfonate-substituted mesityl group; and $A_2$ is a carbon atom.

12. The magenta ink for ink jet recording according to claim 1, wherein, in the general formula (2), m is 0; $R_8$ is a carboxyl group, a carbamoyl group, a trifluoromethyl group or a sulfamoyl group; $R_9$ and $R_{10}$ are hydrogen atoms; $R_{11}$ is a carboxyalkyl group optionally substituted by a carboxyl or sulfamoyl group or a phenyl group optionally substituted by a carboxyl or sulfamoyl group; $R_{12}$ is a hydrogen atom; and $R_{13}$ is a hydrogen atom or an alkyl group.

13. The magenta ink for ink-jet recording according to claim 12, wherein, in the general formula (2), $R_8$ is a carboxyl group at the 2-position of a phenyl group bonded to an azo group; $R_{11}$ is a 2-carboxyphenyl group; and $R_{13}$ is a hydrogen atom.

14. The magenta ink for ink-jet recording according to claim 12, wherein, in the general formula (2), $R_8$ is a carbamoyl group at the 2-position of a phenyl group bonded to an azo group; $R_{11}$ is a 2-carboxyphenyl group; and $R_{13}$ is a hydrogen atom.

15. The magenta ink for ink-jet recording according to claim 12, wherein, in the general formula (2), $R_8$ is a sulfamoyl group at the 3-position of a phenyl group bonded to an azo group; $R_{11}$ is a 2-sulfamoylphenyl group; and $R_{13}$ is an isopropyl group.

16. The magenta ink for ink-jet recording according to claim 12, wherein, in the general formula (2), $R_8$ is a trifluoromethyl group at the 2-position of a phenyl group bonded to an azo group; $R_{11}$ is a 1-carboxy-2-methylbutyl group; and $R_{13}$ is a methyl group.

17. The magenta ink for ink-jet recording according to claim 12, wherein, in the general formula (2), $R_8$ is a carboxyl group at the 2-position of a phenyl group bonded to an azo group; $R_{11}$ is a phenyl group; and $R_{13}$ is a hydrogen atom.

* * * * *